UNITED STATES PATENT OFFICE.

CARLETON ELLIS, OF LARCHMONT, NEW YORK, ASSIGNOR, BY MESNE ASSIGNMENTS, TO CHADELOID CHEMICAL COMPANY, OF NEW YORK, N. Y., A CORPORATION OF WEST VIRGINIA.

INSECTICIDE.

1,082,507.   Specification of Letters Patent.   Patented Dec. 30, 1913.

No Drawing.   Application filed March 11, 1908. Serial No. 420,328.

*To all whom it may concern:*

Be it known that I, CARLETON ELLIS, a citizen of the United States, residing at Larchmont, in the county of Westchester and State of New York, have invented certain new and useful Improvements in Insecticides, of which the following is a specification.

This invention relates to insecticides, and has for its object the production of a slowly-evaporating insecticide which is powerful in its action, but has little or no effect upon varnished woodwork or similar surfaces with which it may come in contact; and comprises wax and carbon bisulfid, or similar penetrating organic liquid, preferably in combination with an aqueous solution having insecticidal properties.

The great objection heretofore found in the use of carbon bisulfid is that of its extremely volatile character, so that its action lasts only for a short period of time. Its use has therefore been largely confined to the treatment of grain in storage, and the like, where its vapors may be to a great extent confined and in close contact with the materials to be treated. For application to exposed surfaces, it has hitherto been found extremely difficult to obtain satisfactory results with carbon bisulfid, because of its great volatility.

My invention overcomes these objections and produces a composition of great efficiency for this purpose. The composition comprises a solution of wax in carbon bisulfid, or similar penetrating organic liquid, emulsified with an aqueous solution, considerably thickened for the purpose of emulsification, and carrying in solution a powerful insecticide such as inorganic compounds like bichlorid of mercury and ammonium fluorid, or organic compounds like ammonium formate, etc.

A suitable illustrative formula may comprise one-half pound of paraffin wax dissolved in carbon bisulfid to make a total volume of one-half gallon emulsified with an aqueous solution of mercuric chlorid and ammonium chlorid, thickened with Irish moss; in the proportion of one-half gallon of water, six ounces of mercuric chlorid, twelve ounces of ammonium chlorid and two ounces of Irish moss. To prepare this composition, I soak the Irish moss in water until the latter is well softened, then heat to boiling with stirring until the moss is dissolved. The solution may then be strained, to remove any undissolved matter, and while still warm, emulsified with the carbon bisulfid solution by adding the latter to the moss solution with agitation in a suitable emulsifier. When the emulsion is completed the ammonium chlorid and mercuric chlorid are added and the agitation continued for a time to largely or wholly dissolve the salts. The composition is then cooled and placed in suitable containers.

The waxes which may be employed with the carbon bisulfid are preferably those of a petrolic nature, such as paraffin wax or ceresin wax, but other waxes, such as beeswax may be used if desired. Other emulsifying agents may be used in lieu of Irish moss, such, for instance, as casein or similar thickening materials; ammonium fluorid or formate may be substituted for the ammonium chlorid, as well as for the mercuric chlorid, if desired, although when using ammonium fluorid contact with glass should be avoided, as it has an etching action upon glass. The ammonium fluorid composition may, however, be packed in glass containers, as the slight local action upon the glass has no material deteriorating action upon the composition as a whole. Other organic liquids may be used alone or in conjunction with carbon bisulfid in such compositions as for example substantially water insoluble hydro-carbons classed among the naphthas, as benzol, also turpentine, rosin spirits, and the like; likewise chlorid of carbon, such as carbon tetrachlorid. The well known property of non-inflammability possessed by the latter makes its use at times advantageous.

I do not herein limit myself solely to the use of carbon bisulfid, but may employ some of the above mentioned volatile organic bodies, or their equivalents, in my improved composition.

What I claim is:

1. An insecticide comprising a slowly evaporating emulsion including a waxy body, carbon bisulfid and an aqueous solution of an inorganic salt having insecticidal properties.

2. An insecticide comprising an emulsion of carbon bisulfid carrying wax in solution, with a proteid thickened aqueous solution of mercuric chlorid.

3. An insecticide comprising carbon bisulfid containing dissolved wax emulsified with an aqueous solution of a mineral salt having insecticidal properties, said aqueous solution carrying a thickener imparting consistency thereto.

4. An insecticide comprising a solution of paraffin in carbon bisulfid emulsified with substantially an equal volume of an aqueous solution of mercuric chlorid thickened with Irish moss.

5. An insecticide comprising an emulsion of a substantially water insoluble highly volatile organic liquid carrying wax in solution; emulsified with an aqueous solution of an inorganic salt having powerful insecticidal properties; said aqueous solution carrying a thickener imparting consistency thereto.

6. An insecticide consisting of an emulsion of a solution of wax in a substantially water insoluble volatile organic liquid, with an aqueous emulsifier carrying an inorganic water-soluble compound having powerful insecticidal properties.

7. An insecticide comprising an emulsion of a solution of wax in a volatile organic wax solvent liquid substantially insoluble in water emulsified with a substantially neutral aqueous emulsifier comprising a strong mineral insecticide dissolved therein.

In testimony whereof I have affixed my signature in presence of two witnesses.

CARLETON ELLIS.

Witnesses:
NATHANIEL L. FOSTER,
HENRIETTA BERKWITZ.